Jan. 1, 1952  A. H. SALMOND ET AL  2,581,047
PIPE COUPLING
Filed Sept. 24, 1949

Inventors
Alexander H. Salmond,
Thomas Denluck,
by
ATTORNEY

Patented Jan. 1, 1952

2,581,047

UNITED STATES PATENT OFFICE 2,581,047

PIPE COUPLING

Alexander H. Salmond and Thomas Denluck,
Victoria, British Columbia, Canada

Application September 24, 1949, Serial No. 117,561
In Canada July 29, 1949

1 Claim. (Cl. 285—123)

This invention relates to a pipe coupling, and the objects of which are to provide a joint, or pipe connector in two parts, each of which part is semi-spherical as regards its main portion and extends integrally as a tubular pipe connecting portion for the passage of fluids through the coupling, which latter portions are threaded for the reception of pipes or rods if the coupling is being used as a rod connector for which it is also well adapted, an external union is provided to connect the two portions together.

An advantage in our invention is that the two parts of the coupling may be adjusted to any relative angularity to provide for the joining of two pipes or rods, the axial alignment of which are not coincident, and that there is no limitation to the degree of obtuse angularity between the axes of the pipes or rods to be connected ranging from 90 degrees to a perfectly straight axial coincidence, which angular adjustment is a considerable advantage in such connections around corners.

A further advantage is that there is no obstruction in the passageway through the joint which could so readily cause clogging to stop the flow therethrough.

A still further advantage is that the connection of the two parts is a very simple matter, when the two hemispherical elements are brought together and the union turned to provide a leakproof pipe fitting, or a thoroughly efficient rod connection.

With our invention a wider range of connection adjustments is evident than in conventional so called universal couplings, and eliminates elbows and pipe bending, and an essential improvement is that the passageway is open throughout the length of the coupling due to the absence of the usual internal cap-screw or pivot bolt for connecting the two semi-spherical or similar conventionally shaped parts together, which parts may similarly be termed hemispheroids.

There are no internal springs or nuts in our invention, the tightening of the joint or coupling being accomplished by merely turning an exterior union member to bring the contacting faces tightly together.

With these objects and advantages in view this invention consists in the novel features of construction hereinafter described and claimed, and in the drawings accompanying this specification it must be observed that similar numerals refer to similar parts throughout the different views.

Figure 3:
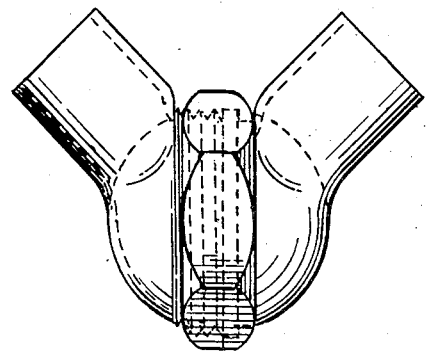
Fig. 3 is a view of the coupling as used for a 90 degree connection.
Figure 4:
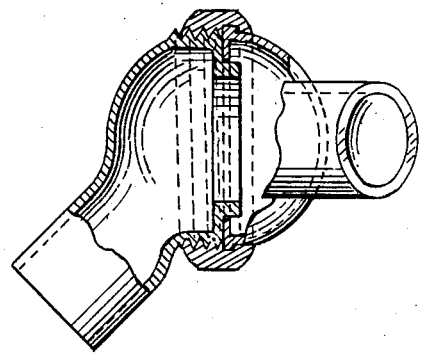
Fig. 4 is a part sectionalized view showing the angular adjustability of the coupling.
Figure 5:
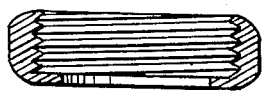
Fig. 5 is a view of the union in section used for connecting the two elements of the coupling together.

With reference to the drawings the numeral 1 indicates one semi-spherical part of this pipe coupling, and the numeral 1a refers to the other semi-spherical part thereof, each of which part is chambered as indicated at 2 and 2a respectively. Each said part has a tubular extension socket 3 and 3a respectively, and integral therewith, which may be threaded as indicated in Figure 3, and each said separate part communicates with its chambered part mentioned. Thus there is a clear passageway for fluid through this coupling without any kind of obstruction, which is the main object of this invention.

Figure 1:
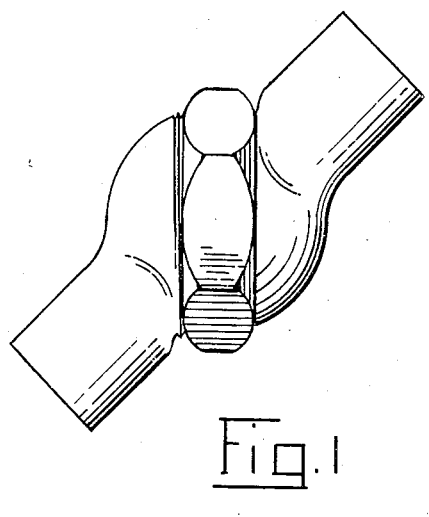
Fig. 1 is a view of the complete coupling for joining two straight-in-line pipes together.
Figure 2:
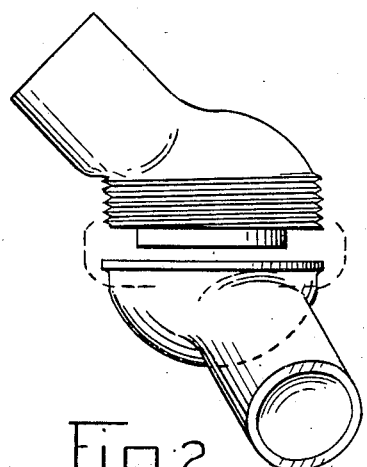
Fig. 2 is a view showing the two coupling parts apart.

The two portions of the coupling are illustrated as separated in Fig. 2, to demonstrate their connection features. One part 1 is externally threaded circumferentially as at 4 and is formed with an annular rib 5 of large internal diameter compared with that of the extension members 3 and 3a. This rib 5 fits into a circular flange or shoulder 6 of the coupling member 1a to contact the flat annular face 7 of the member 1 from which the rib 5 extends. A gasket could be advantageously inserted between these two flat faces.

The coupling of the two parts in this joint is done by means of an internally threaded union 8 which screws on the threads 4, and would be secured by a wrench. The member 1a is provided with a circular flange 9 projecting outwardly from the outer circumference thereof, over which flange a circular clamping rim 10 of the union fits so that the two half parts of the coupling may be drawn together tightly as a connected unit when the union is screwably turned.

There are recesses 11 in the extension members 3 and 3a which permit a minimum sized union being used so that the coupling will appear as compact and neat in shape as possible.

Whereas the terms semi-spherical and hemispherical, and their relative equivalents, have been used herein, in the specification and claim, it is to be understood that such terms refer to the same things, which equivalency applies also to the term collar as the same thing as a union, as used herein.

What we claim and for which we desire Letters Patent is:

A pipe coupling comprising in combination a pair of substantially similar mating components consisting of a hemispheroid, a socket projecting from the exterior side of the hemispherical surface thereof, the axis of said socket being radially disposed in relation to said hemispheroid, said axis lying at or about 45 degrees from the produced plane of the perimeter of said hemispheroid, one of said hemispheroids being externally and perimentrically screw-threaded, the other being provided with an externally projecting, perimetrical flange, an inwardly projecting perimetrical flange on the hemispheroid containing said outwardly projecting flange, an annular inwardly projecting and perimetrical rib of right-angular cross-section of the hemispheroid which is screw-threaded, said inwardly projecting flange fitting into the interior angle formed by said rib cross-section, and abutting said rib, and an annular, internally screw-threaded collar or union for uniting said hemispheroids.

ALEXANDER H. SALMOND.
THOMAS DENLUCK.

REFERENCES CITED

The following references are of record in the file of this patent:

UNITED STATES PATENTS

| Number | Name | Date |
| --- | --- | --- |
| 1,031,642 | Haase | July 2, 1912 |
| 1,125,642 | Blanchard | Jan. 19, 1915 |
| 1,285,849 | Walling | Nov. 26, 1918 |